(No Model.)
C. PROFROCK.
PLOW.
No. 283,659. Patented Aug. 21, 1883.
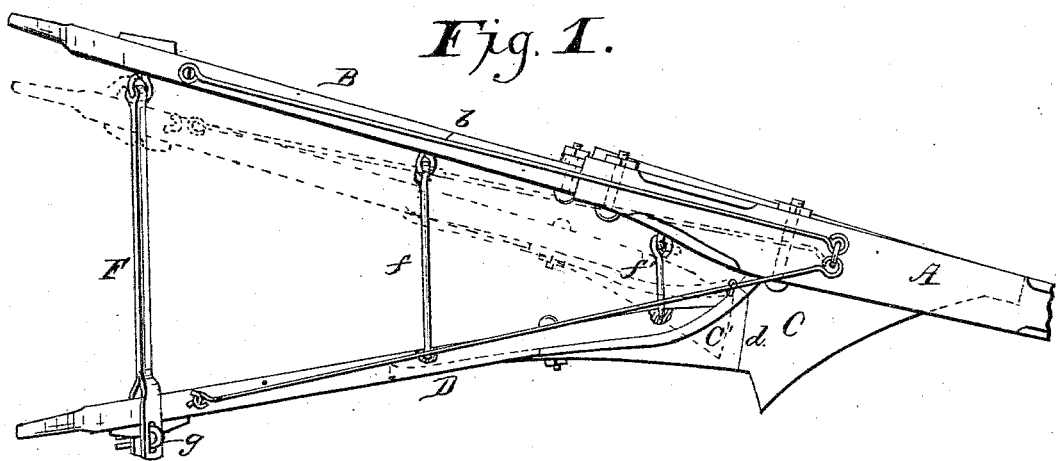
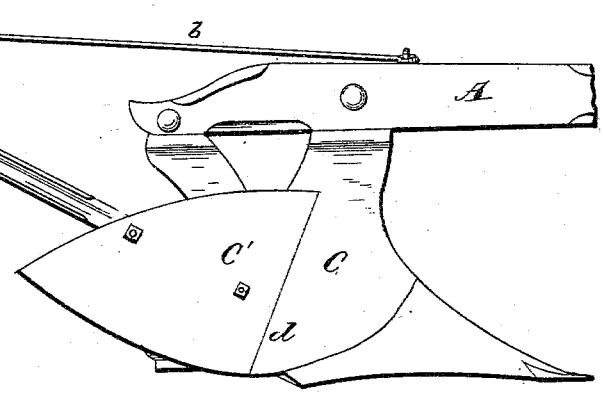
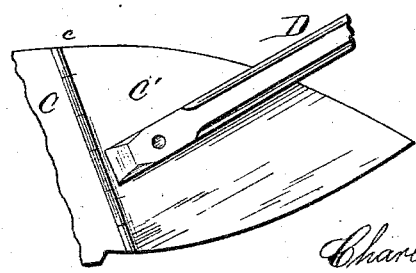
Witnesses:
Charles Profrock
Inventor:
Att'y.

UNITED STATES PATENT OFFICE.

CHARLES PROFROCK, OF HADLEY, MICHIGAN.

PLOW.

SPECIFICATION forming part of Letters Patent No. 283,659, dated August 21, 1883.

Application filed May 17, 1883. (No model.)

*To all whom it may concern:*

Be it known that I, CHARLES PROFROCK, a citizen of the United States of America, residing at Hadley, in the county of Lapeer and State of Michigan, have invented certain new and useful Improvements in Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in plows, its object being to provide a means whereby the length of the mold-board may be lessened and the width of the furrow decreased, so as to obviate and lessen what is termed the "ditch," which is usually left in plowed fields; and to this end my invention consists in the construction and combination of the parts, as will be hereinafter more fully set forth, and pointed out in the claim.

In the annexed drawings, which illustrate my invention, Figure 1 is a plan view; Fig. 2, a side view; and Fig. 3, a detailed view, showing one of the handles attached to the hinged portion of the mold-board.

In the accompanying drawings, A represents a plow-beam to which the landside-point and the forward portion of the plow-share are attached in the usual manner, and to the same is attached the handle B, which may be braced to the plow-beam by the rod $b$. The mold-board of the plow is made in two parts, C and C', the forward portion, C', being attached to the standards or frame of the plow in the usual manner, while the rear portion is hinged to the same on its inner surface, as shown at $c$. This joint inclines from the upper portion of the mold-board rearwardly, as shown in Fig. 2 at $d$, so as to bring the lower end of the hinge near that portion of the mold-board adjacent to the rear end of the point.

To the inner side of the portion of the mold-board C' is secured, by suitable bolts, the handle D, which is braced to the plow-beam by means of bolts or other equivalent connections. The cross-bars $f$ and $f'$ fit within suitable sockets formed in the handle D at points opposite to where they are hinged or attached to the handle B. The upper cross-bar, F, is bifurcated at its end, so as to overlap the handle, and is provided with a longitudinal slot, $g$, in which may be placed a spring-key, which fits within the groove formed at the end of the handle. By means of this key and slot the handles will be held securely together and the cross-bars $f\ f'$ will brace the same, thereby holding the hinged portion of the mold-board C' in its normal position.

When the bracing-rods are in position, as shown in Fig. 1 in full lines, the plow may be used in the ordinary manner, and the width of the furrow will depend upon the total length of the mold-board; but when the cross-bar F is released the cross bars or braces $f$ and $f'$ will fall out of position, and the handle may be placed in the position shown in dotted lines in Fig. 1, in which case the hinged portion of the mold-board will be on a line with the stationary portion of the mold-board and point of the plow, and the furrow made will correspond in width therewith. To avoid making a ditch in the field it will be only necessary to let the hinged portion of the mold-board be placed on a line with the stationary portion on the last few furrows.

Having thus described my invention, what I claim as new, and desire to secure by Letters Patent, is—

In a plow, the mold-board formed in two parts and united to each other by a hinge, in combination with the standards, point, and beam, and the rigid handle B, provided with braces F, $f$, and $f'$, adapted to hold and be secured to the movable handle D, substantially as shown, and for the purpose set forth.

In testimony whereof I affix my signature in presence of two witnesses.

CHARLES PROFROCK.

Witnesses:
JASPER BENTLEY,
WM. B. HAMILTON.